United States Patent [19]
Mausner et al.

[11] Patent Number: 5,121,728
[45] Date of Patent: Jun. 16, 1992

[54] LOAD ADJUSTMENT DEVICE

[75] Inventors: Eberhard Mausner, Liederbach; Manfred Pfalzgraf, Frankfurt am Main, both of Fed. Rep. of Germany

[73] Assignee: VDO Adolf Schindling AG, Frankfurt am Main, Fed. Rep. of Germany

[21] Appl. No.: 746,324

[22] Filed: Aug. 16, 1991

[30] Foreign Application Priority Data

Oct. 1, 1990 [DE] Fed. Rep. of Germany ....... 4031002

[51] Int. Cl.$^5$ .................. F02D 9/02; F02D 11/10; B60K 26/04; B60K 26/02
[52] U.S. Cl. .................................. 123/399; 123/361; 123/339
[58] Field of Search ............ 123/361, 339, 399; 180/197

[56] References Cited

U.S. PATENT DOCUMENTS

| | | | |
|---|---|---|---|
| 4,892,071 | 1/1990 | Asayama | 123/399 X |
| 4,896,640 | 1/1990 | Pfalzgraf et al. | 123/361 X |
| 4,919,097 | 4/1990 | Mitui et al. | 123/361 X |
| 4,953,529 | 9/1990 | Pflazgraf et al. | 123/361 X |
| 5,020,496 | 6/1991 | Huber et al. | 123/399 |
| 5,035,213 | 7/1991 | Pfalzgraf et al. | 123/361 X |
| 5,065,722 | 11/1991 | Huber et al. | 123/361 X |

FOREIGN PATENT DOCUMENTS

| | | |
|---|---|---|
| 0107265 | 5/1984 | European Pat. Off. . |
| 0182020 | 5/1986 | European Pat. Off. . |
| 3836471 | 5/1989 | Fed. Rep. of Germany . |

*Primary Examiner*—Willis R. Wolfe
*Attorney, Agent, or Firm*—Martin A. Farber

[57] ABSTRACT

A load adjustment device has a control element (8) for action on at least two setting members (9a, 9b) which determine the output power of an internal combustion engine. The control element is spring-coupled with a driver (3) which can be actuated via an accelerator pedal (1) and, in addition, can be moved by means of an electric setting drive (10). A desired-value detection element (5) is associated with the driver and an actual-value detection element (22) which acts on the electric setting drive and cooperates with the desired-value detection element is provided. The electric setting drive is adapted to be controlled as a function of the values detected by an electronic control device (6). The setting members are developed, in particular, as throttle valves, the driver being adapted to be brought into functional relationship with all setting members, and the electric setting drive being adapted to be brought into functional relationship with at least one of the setting members.

21 Claims, 4 Drawing Sheets

LOAD ADJUSTMENT DEVICE

FIELD AND BACKGROUND OF THE INVENTION

The present invention relates to a load adjustment device having a control element for action on at least one setting member which determines the output of an internal combustion engine. The control element is spring-coupled with a driver actuated by an accelerator pedal and, furthermore, is moveable by means of an electric setting drive. The control element has a desired-value detection element associated with the driver, and has an actual-value detection element cooperating with the desired-value detection element and acting on the electric setting drive. The electric setting drive is adapted to be controlled by an electronic control device as a function of the values detected.

Such a load adjustment device is known from Federal Republic of Germany patent document 38 15 734 A1. It serves the purpose of replacing the customary control of a setting member on the accelerator-pedal side under certain operating conditions of the internal combustion engine or of the vehicle driven by it by a setting drive controlled by the control electronics. Thus the electronic control device can, for instance, act in a manner to avoid wheel slippage upon starting as a result of excessive power. It is provided also that, upon too rapid a depression of the accelerator pedal, the setting member is more strongly controlled downward than corresponds to the position of the accelerator pedal, so that the internal combustion engine produces only a power which does not lead to the spinning of the wheels. Other automatic actions on the load adjustment device are necessary if a transmission is to be switched automatically or if the idling speed of rotation is to be adjusted to a constant value even upon different power requirements upon idling, for instance on the part of load-consuming devices provided in the vehicle. Finally, there is also the possibility, in the case of the load adjustment device, to act in the manner of a speed governor, which, due to the possibility of a disconnecting of the control element from the accelerator pedal, provides in each case a power which is necessary in order to maintain the speed set. In addition, it may be desirable from the standpoint of driving comfort to provide a progressive or degressive action of the accelerator pedal with the possibility of a power setting which is reduced or increased with respect to the accelerator pedal.

In the known load adjustment device, the control element cooperates with a setting element which is developed, for instance, as a throttle valve. In particular, in the event of control of the idling by means of the electric setting drive, the problem arises, when using a setting member, that a small angle of displacement of the throttle valve must be controlled by means of the setting drive. In order to satisfy this requirement, it is necessary to develop the electric setting drive with an expensive construction, which is true, in particular, when the setting drive is to cover not only the idling control range but also—as is necessary in the case of speed control—the partial-load and full-load ranges of the internal combustion engine.

SUMMARY OF THE INVENTION

It is an object of the present invention to develop a load adjustment device of the foregoing type in such a manner that the various conditions of load of the internal combustion engine can be controlled with great precision with a structurally simple development. The load adjustment device should, furthermore, offer the possibility, in accordance with the individual requirements described, of being combined in the manner of a system module.

According to the invention, a plurality of setting members (9a, 9b) are provided and the driver (3) is functionally connected to all setting members (9a, 9b) and to an electric setting drive (10) to at least one of the setting members (9a). The load adjustment device of the invention makes it possible to control the setting members as desired via the driver and to control at least one control element as desired via the electrical setting drive. The preferred field of use is the register arrangement of setting members in the form of throttle valves, whereby there is the possibility, particularly when two setting members are used, of covering the idle control range by means of the first throttle valve over a large angle of adjustment and covering the partial-load/full-load range by means of the second throttle valve. In this connection, in the idle control range, the driver acts preferably only on the setting member for this range, while the other setting member is acted on only in the partial/full-load region. The same applies to the control of the setting member or members via the electric setting drive. Here it is provided, in particular, that the electric setting drive can be brought into functional connection with the setting member which covers the idle control region. If the partial-load/full-load region of the internal combustion engine is also to be regulated by means of the electric setting drive, then an action of the electric setting drive on the setting member associated with this load region is furthermore provided.

The present invention therefore fundamentally concerns a load adjustment device of the foregoing type in which several setting members are provided, the driver being adapted to be brought into functional connection with all setting members and the electric setting drive being adapted to be brought into functional connection with at least one of the setting members. The electric setting drive (10) can furthermore be brought into functional connection with all setting members (9a, 9b) and, furthermore, it can be provided that the driver (3) can be brought in succession into functional connection with the setting members (9a, 9b). The same applies to the electric setting drive (10).

According to a feature of the invention, the electric setting drive (10) can be brought, in succession, into functional connection with the setting members (9a, 9b).

Preferably, two setting members (9a, 9b) are provided, the first of which (9a) is acted on in the idle range and the second (9b) is acted on in the partial-load/full-load range of the internal combustion engine. The setting members are developed in particular as throttle valve (9a, 9b). The load adjustment device of the invention thus makes idle control possible via a control of one setting element by means of the electric setting motor, and speed control and anti-slip control possible upon possible action of driver and electric setting motor on all setting members in register operation.

In accordance with a special feature of the invention, it is provided that the control element (8) has a control-element part (8a) on the driver side which is coupled to the driver (3) and cooperates with a first control-element part (8b) on the setting-member side which is associated with a first setting member (9a). The control element part is operative with a second control-element part (8c) on the setting-member side which is associated with a second setting member (9b) and there is provided a control element (8d) on the setting-drive side which can be controlled via the electric setting drive (10) and cooperates with at least one of the setting members (9a) and preferably furthermore with both control element parts on the setting-member side.

In accordance with one particular embodiment of the invention, the control element comprises step-up elements so that driver-side movements can be transferred stepped-up to one or more of the setting members, and setting-drive side movements can be transmitted stepped-up to one or more of the setting members. Herein, a stepping-down is, of course, also to be understood here.

With a splitting of the control ranges of the internal combustion engine essentially into an idle control range by means of one setting member and a partial-load/full-load control range by means of the other setting member, at least the last-mentioned setting member should be actuated by means of the step-up elements. However, it is also conceivable that the setting member associated with the idling control range also be actuated by step-up elements. The action of the step-up elements on the setting members can take place at different times, for instance in the manner that first of all the setting member covering the idle control range is acted on and only when the $LL_{max}$ point is reached is the other setting member acted on, in which case, of course, a control of the setting member associated with the idling range can also take place in the partial-load/full-load range.

According to a feature of the invention, the control-element part (8d) on the setting-drive side cooperates with the first and second control-element parts (8b, 8c) on the setting-member side.

Further by a feature of the invention, the control element (8) comprises step-up elements (16, 18, 19).

Still further according to the invention, the control-element part (8a) on the driver side acts via a step-up element (16) on the second control-element part (8c) on the setting member side.

Also according to the invention, the control-element part (8a) on the setting-drive side acts via a step-up element (18) or elements (18, 19) on the first and/or second control-element parts (8b, 8c) on the setting-member side Yet further according to the invention, the step-up elements (16, 18, 19) act on the setting members (9a, 9b) upon different conditions of load of the internal combustion engine.

According to a special development of the invention, the first and second setting members (9a, 9b) or the first and second control-element parts (8b, 8c) on the setting member side are urged by springs (11a, 11b) in idling direction. This results, on the one hand, in an unambiguous guidance between the setting member and the driver or control element while, on the other hand, assurance is had that, upon failure of the electric setting drive or a jamming of the driver or the breaking of the spring urging the driver in idling direction, the setting members are returned in defined manner into the idling position. In addition, there should be associated with the driver (3), as well as with the first and second control-element parts (8b, 8c) on the setting-member side, safety contacts (7, 12, 13) which detect their unactivated positions, by means of which the plausibility conditions with regard to the control of the setting member can be represented via the driver and the electric setting drive. The actual-value detection element (22) is advantageously associated with the control-element part (8d) on the setting-drive side.

A further development of the invention provides that the control-element part (8d) on the setting-drive side extends in the upward control direction into the path of movement of the setting drive on the driver side. In this way, an anti-slip control can be easily obtained so that, by means of the control-element part on the setting-drive side the control-element part on the driver-side which is coupled to the driver via the coupling spring is moveable and the load adjustment device can therefore be down-controlled. Furthermore, it can be provided that the driver-side control-element part (8a) extends in upward control direction into the path of movement of the setting-member side control-element part (8c) which is associated with the setting member (9b) which covers the partial-load/full-load range of the internal combustion engine. In this way, there is assured the formation of a maximum value, i.e. the driver-side control-element part and thus the driver coupled with it and, furthermore, the accelerator pedal are in a position which corresponds to the existing power setting on the setting members, even if the control of the setting members takes place via the electric setting drive.

Finally, it can be provided that a stop (28) extends in the direction of downward control in the transition from idling to partial load into the path of movement of the control-element part (8c) on the setting-member side which is associated with the setting member (9b) which covers the partial-load/full-load range of the internal combustion engine. In this case, there is effected, via the electric setting drive, merely a control of the setting member which covers the idle control range and the region of travel of the control-element part on the setting-drive side is limited in upward control direction by the stop.

BRIEF DESCRIPTION OF THE DRAWINGS

With the above and other objects and advantages in view, the present invention will become more clearly understood in connection with the detailed description of preferred embodiments, when considered with the accompanying drawings, of which

DETAILED DESCRIPTION OF THE PREFERRED EMBODIMENTS

All embodiments relate to two setting members which are developed as throttle valve; the embodiments are intended to illustrate different sizes of the system module for the load adjustment device.

FIGS. 1 to 4 show the embodiments in a valued linear showing.

Figure 1:
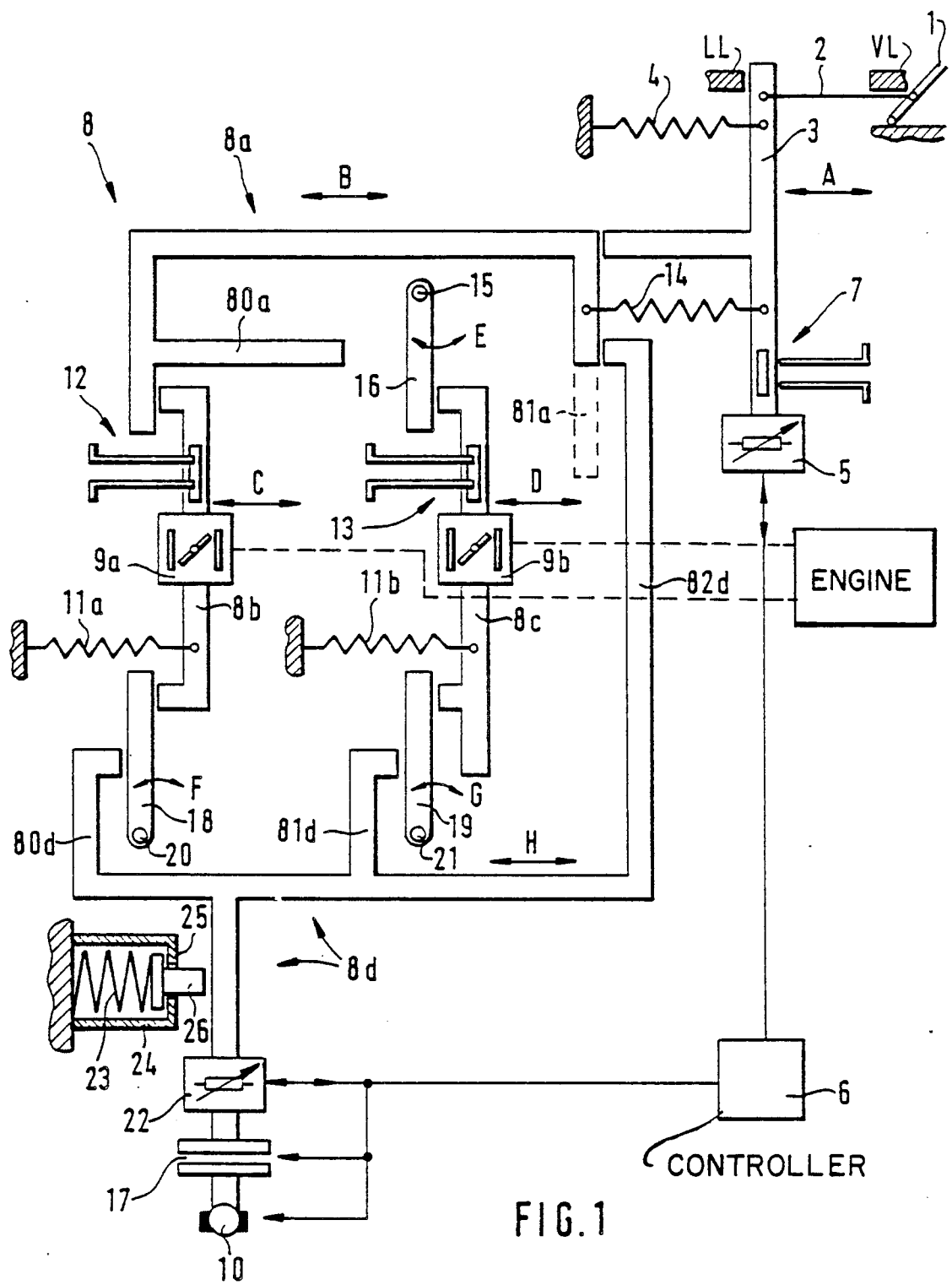
FIG. 1 is a block diagram of the load adjustment device with the system module function of the universal "electronic gas pedal"

FIG. 1 shows an accelerator pedal 1 by means of which, via a rod 2, a single-piece driver 3 can be displaced between an idle stop LL and a full-load stop VL.

The driver 3 and thus the accelerator pedal are urged in idle direction by means of a return spring 4 which acts on the driver 3. The driver 3 is connected with a desired-value detection element 5 in the manner of a potentiometer wiper which cooperates with an electronic control device 6. The idle position of the driver 3 is detected by means of a safety contact 7 which also cooperates with the electronic control device 6.

The load adjustment device furthermore has a control-element part 8 which cooperates with two setting members 9a and 9b, developed as throttle valve. The throttle valve 9a serves in this connection primarily for control of the idling range of the internal combustion engine, while the throttle valve 9b serves for control of the partial-load/full-load range. The control element 8 and thus the throttle valves 9a and 9b are controlled via the driver 3 and/or an electronic setting drive 10.

The control element 8 consists of a control-element part 8a on the driver side, a first control element 8b on the setting-member side which acts on the throttle valve 9a, a second control-element part 8c on the setting-member side which acts on the throttle valve 9b, and a control-element part 8d on the setting-drive side. The two control-element parts 8b and 8c on the setting-member side are each urged in idling direction by means of return springs 11a and 11b respectively. The starting positions of the two control-element parts 8b and 8c on the setting-member side are monitored by safety contacts 12 and 13, thus the safety contact 12, for instance, monitors an LL$_{emergency}$ position of the first control-element part 8b on the setting-member side, and the safety contact 13 monitors the minimum partial-load position of the second control-element part 8c on the setting-member side. The safety contacts 12 and 13 cooperate, as does the safety contact 7, with the electronic control device 6.

The control-element part 8a on the driver side is so developed that, in the upward control direction, it contacts the driver 3 and the second control-element part 8b on the setting-member side. The connection between the driver 3 and the first control-element part 8a on the setting-member side is effected by a coupling spring 14 which pulls the two parts against each other. Into the upward control path of the control-element part 8a on the driver side, there furthermore extends a step-up element 16 which is swingable about a stationary point 15. Upon movement of the control-element part 8a on the driver side in the direction of upward control, an extension 80a on the control-element part 8a on the driver side, upon reaching the partial-load region of the control-element part 8a on the driver side at a distance from the fixed point 15, comes against the step-up element 16 and swings it together with the second control-element part 8c on the setting-member side which rests against the step-up element 16. The linear movement of the driver 3 which results from the linear showing is indicated by the arrows A, the corresponding linear movement of the control-element part 8a on the driver side being indicated by the arrows B, the linear movement of the two control-element parts on the setting-member side being indicated by the arrows C and D, and the swinging movement of the step-up element 16 being indicated by the arrows E.

The control of the control-element part 8d on the setting-drive side is effected via the electric setting drive 10 and a coupling 17 behind same. The control-element part 8d has two extensions 80d and 81d, the extension 80d cooperating with a transmission element 18 which, in turn, cooperates with the first control-element part 8b on the setting-member side; in corresponding manner a transmission element 19 is associated with the extension 81d, and the second control-element part 8c on the setting-member side is associated with said transmission element 19. The transmission element 18 is swingable around a fixed point 20, in which connection the extension 80d which contacts the transmission element 18, spaced from the fixed point 20, swings the transmission element in the direction of the arrows F and thus makes possible movement of the first control-element part 8b on the setting-member side in the idling control range by means of the control-element part 8d on the setting-drive side. In corresponding manner, the transmission element 19 extends in the upward control direction of the extension 81d into the path of movement of said transmission element so that the extension 81d contacts the latter, spaced from a fixed point 21, upon reaching a position of partial load and, via a swinging movement of the transmission element 19 in accordance with the arrow G, a displacement of the second control-element part 8c on the setting-member side is possible by means of the electric setting drive in the partial-load/full-load range of the load adjustment device.

The instantaneous position of the control-element part 8d on the setting-drive side is detected by an actual-value detection element 22 which cooperates with the electronic control device 6. The latter also controls the electric setting drive 10 and the coupling 17.

The controlling of the two throttle valves 9a and 9b can be effected first of all exclusively via the accelerator pedal 1 and thus the driver 3. A movement of the accelerator pedal 1 in the upward control direction leads to a corresponding movement of the driver 3, which, via the coupling spring 14, moves the control-element part 8a on the driver side in the upward control direction indicated by the arrow B. In the idle control range, the control-element part 8a on the driver side comes in this connection only against the first control-element part 8d on the setting-member side, which leads to a controlling of the throttle valve 9b. Only after leaving the idle control range does the extension 80a of the driver-side control-element part 8a come against the transmission element 16, whereby, upon a further upward control movement of the control-element part 8a on the driver side, an upward-control displacement of the second control-element part 8c on the setting-member side takes place and, thus, a regulating of the throttle valve 9b which covers the partial-load/full-load range.

As a general rule, the throttle valve 9a remains open during the controlling of the load adjustment device in the partial-load/full-load range, but it is nevertheless conceivable that a further upward control movement of the control-element part 8a on the driver side leads to a downward-control movement of the throttle valve 9a. If the load is to be adjusted via the electric setting drive 10, then the electric setting drive 10 is activated via the electronic control device 6, and the clutch 17 is closed. This leads to a movement of the control-element part 8d on the setting-drive side in upward control direction, indicated by the double-ended arrow H, so that first of all, via the extension 80d, the transmission element 18 is swung in upward control direction. The first control-element part 8b on the setting-member side, which cooperates with the throttle valve 9a, is swung. Upon reaching the partial-load range of the load adjustment device, there is furthermore a swinging of the transmission element 19 via the extension 81d of the control-element part 8a on the setting-drive side. This leads in the partial-load/full-load range of the load adjustment device to a control via the throttle valve 9b.

In this connection, the electronic control device 6 detects those signals which come from the safety contacts 7, 12 and 13, the desired-value detection element 5, and the actual-value detection element 22. Furthermore, external variables of state concerning the internal combustion engine or, in general, concerning the vehicle equipped with it, are introduced into the electronic control device 6, called up by the latter, and transferred from the electronic control device 6 to the parts of the load adjustment device which are controlled by it. The electronic control device 6 thus serves, in cooperation with these parts, for the purpose of building up a safety logic with regard to the control of driver 3 and control element 8.

If, upon an idle position of the control element 8 which is less than an idle emergency position $LL_{emergency}$, the electronic control device 6 or the electric setting drive 10 does not operate properly, a path-limited spring 23 which is prestressed in the direction of the maximum idling position effects the transfer of the first control-element part 8b on the setting-member side, and thus of the throttle valve 9a controlling idling into the idle emergency position. The limitation of the path of the spring 23 can be effected, for instance, by a ram 26 which is acted on by the spring 23 and displaceable within a stationary sleeve 24 against a stop 25. Upon movement of the control-element part 8d on the setting-drive side by means of the electric setting drive 10 in the direction towards minimal idle position, the ram 26 is pushed by the control-element part 8d on the setting-drive side into the sleeve 24 and thereby further tensions the spring 23.

By the load adjustment device of the invention, the most different problems can be controlled by the module principle. In the development in accordance with FIG. 1, an idle control is first of all possible via the extension 80d of the control-element part 8d on the setting-drive side. Furthermore, by the extensions 80d and 81d, a speed control is possible over the entire operating range of the vehicle. Despite this, a corresponding control in the idling range or the entire operating range of the vehicle is possible via the driver 3 and the control-element part 8a on the driver side. In addition, the load adjustment device shown makes it possible, on basis of the extended extension 81a, shown in dashed line, and on the basis of the control-element part 8a on the driver side which extends on the upward control side of the second control-element part 8c on the setting-member side into the path of movement of said part, to form a maximum vale. By the development of the control-element part 8d on the setting-drive side with an additional extension 82d which engages behind the driver-side control-element part 8a in upward control direction, an anti-slip control is furthermore provided. This occurs because the electric setting drive 10 and thus the control-element part 8d on the setting-drive side can act directly, contrary to the action of the driver 3 and of the accelerator pedal 1 and against the force of the coupling spring 14, on the control-element part 8a on the driver side.

Figure 2:
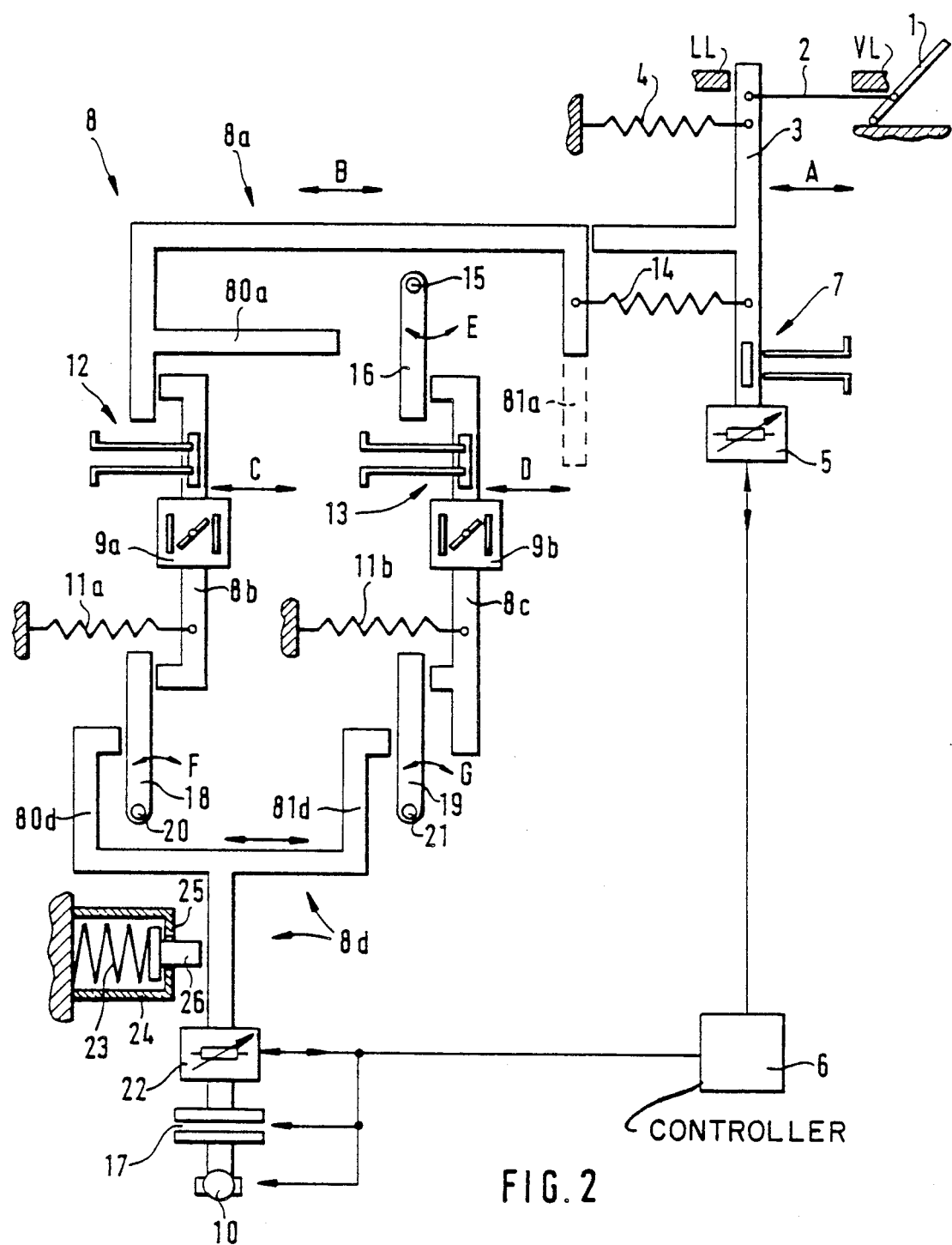
FIG. 2 is a block diagram for the system module function of the idling control and the speed-limiting control.
Figure 3:
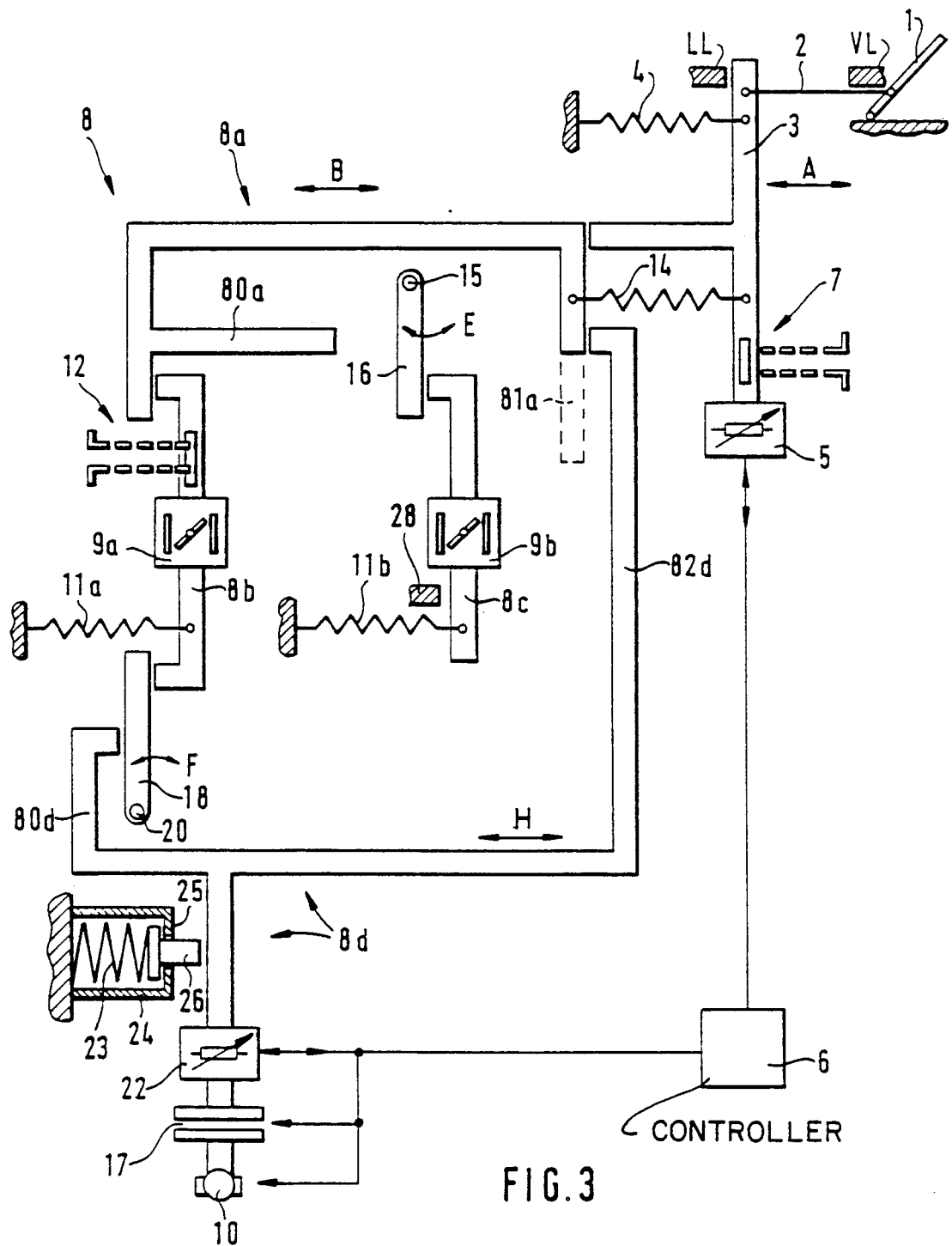
FIG. 3 is a block diagram for the system module function of the idling control and of the anti-slip control.
Figure 4:
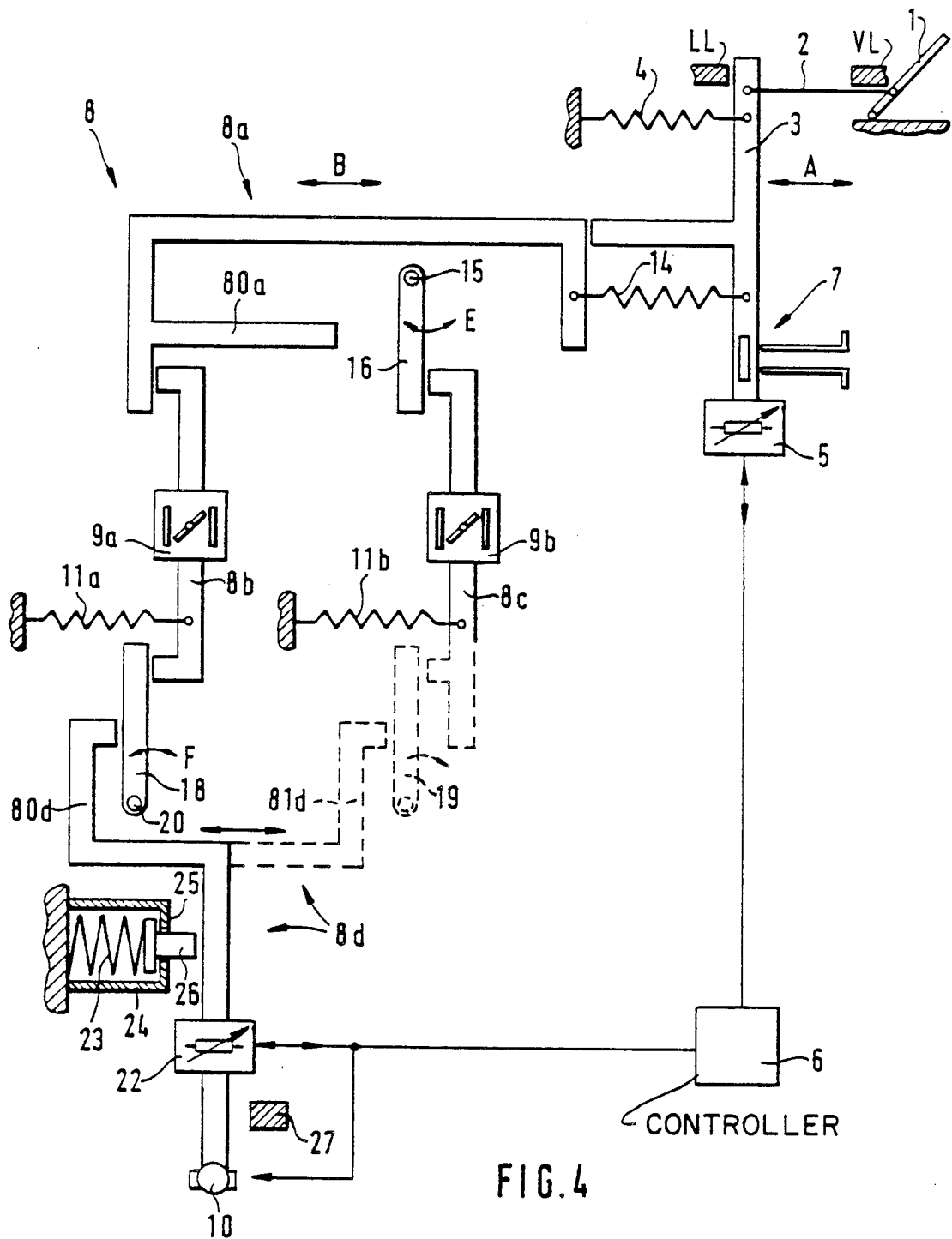
FIG. 4 is a block diagram for the system module function of the idling control.

FIG. 2 shows, for the load adjustment device of the invention, the system module which has all functions described in FIG. 1, except the anti-slip control function. This showing in FIG. 2 does not contain the extension 82d of the control-element part 8d on the setting-drive side which extension engages behind the driver-side control-element part 8a. The system shown therein therefore serves for the electronic idle control and the speed-limiting control. In the system as shown in FIG. 3, an idle control as well as an anti-slip control are possible; in this case there is absent, as compared with the showing of FIG. 1, the extension 81d of the control-element part 8d on the setting-drive side and the transmission element 19 cooperating with it so that the control of the throttle valve 9b via the electric setting drive 10 is absent. In this showing, a stop 28 limits the movement of the control-element part 8c in the transition from the partial-load to the idle range. In FIG. 4, the solid lines show that exclusively an idle control is possible there, for which reason also a stop 27 which limits the $LL_{max}$ position is provided. The dashed line showing in which the extension 80d and the transmission element 18 as well as the stop 27 are lacking, constitutes an alternative in which only an electronic control of the throttle valve 9b takes place.

We claim:

1. A load adjustment device operative with an accelerator pedal and having a control element for action on at least one setting member which determines the output of an internal combustion engine, the load adjustment device comprising
    a plurality of setting members including said at least one setting member, a driver actuated by the accelerator pedal and being spring-coupled to the control element, an electric setting drive, a desired value detection element operative with the driver, an actual value detection element operative with the desired value detection element and acting upon the electric setting drive, and an electronic control device;
    wherein the driver is moveable by means of said electric setting drive, the electric setting drive is controllable by the electronic control device as a function of detected values of engine parameters;
    the driver is functionally connected to all of said setting members, and said electric setting drive is functionally connected to at least one of said setting members.

2. A load-adjustment device according to claim 1, wherein the electric setting drive is connectable into functional connection with all of said setting members.

3. A load-adjustment device according to claim 2, wherein
    the load-adjustment device is operable to bring the driver into functional connection successively with a first and a second of said plurality of setting members.

4. A load-adjustment device according to claim 1, wherein
    the load-adjustment device is operable to bring the driver into functional connection successively with a first and a second of said plurality of setting members.

5. A load-adjustment device according to claim 2, wherein
    the load adjustment device is operative to bring the electric setting drive into successive functional connections with successive ones of the setting members.

6. A load-adjustment device according to claim 3, wherein the load adjustment device is operative to bring the electric setting drive into successive functional connections with successive ones of the setting members.

7. A load-adjustment device according to claim 1, wherein
there are two of said setting members, a first of said setting members being acted on in the idle range, and a second of said setting members being acted on in the partial-load/full range of the internal combustion engine by said driver and said setting drive.

8. A load-adjustment device according to claim 1, wherein each of said setting members comprises a throttle valve.

9. A load-adjustment device according to claim 1, wherein
there are a first and a second of said setting members;
said control element comprises a first and a second and a third and a fourth control-element part;
the first control-element part is on a driver side of the control element, the first control element part being coupled to the driver and cooperating with the second control-element part, the second control-element part being disposed on a setting-member side of the control element, and being operative with the first setting member; said third control-element part is disposed on the setting-member side of the control element, and operates with the second setting member;
the fourth control element part being disposed on a setting-drive side of the control element for control by the electric setting drive to cooperate with at least said first setting member.

10. A load-adjustment device according to claim 9, wherein
said fourth control-element part cooperates with the first and the second control-element parts.

11. A load-adjustment device according to claim 9, wherein
the control comprises a plurality of step-up elements.

12. A load-adjustment device according to claim 11, wherein
said first control-element part acts via on of said step-up elements on said third control-element part.

13. A load-adjustment device according to claim 11, wherein
said first control-element part acts via one or more of said step-up elements upon said second and/or said third control-element part.

14. A load-adjustment device according to claim 12, wherein
said first control-element part acts via one or more of said step-up elements upon said second and/or said third control-element part.

15. A load-adjustment device according to claim 11, wherein
said step-up elements act on said first and said second setting members upon different conditions of load of the internal combustion engine.

16. A load-adjustment device according to claim 9, further comprising
springs for urging said first and said second setting members or said second first and said third control-element parts in idling direction.

17. A load-adjustment device according to claim 9, further comprising
a plurality of safety contacts operative with the driver and with said second and said third control-element parts for detecting unactivated positions of said second and said third control-element parts.

18. A load-adjustment device according to claim 9, wherein
the actual-value detection element is operatively associated with said fourth control-element part.

19. A load-adjustment device according to claim 9, wherein
said fourth control-element part extends in an upward control direction into a path of movement of said first control element part.

20. A load-adjustment device according to claim 9, wherein
said first control-element part extends in upward control direction into a path of movement of said third control-element part for operation with said second setting member in the partial-load/full-load range of the internal combustion engine.

21. A load-adjustment device according to claim 9, further comprising
a stop which extends, in a direction of downward control in a transition from idling to partial load, into a path of movement of said third control-element part in cooperation with said second setting member over the partial-load/full-load range of the internal combustion engine.

* * * * *